United States Patent [19]
Packard et al.

[11] 3,864,645
[45] *Feb. 4, 1975

[54] ELECTRON BEAM LASER OPTICAL SCANNING DEVICE

[75] Inventors: James R. Packard; Donald A. Campbell, both of St. Paul; William C. Tait, Village of Oak Park Heights; Gunther H. Dierssen, White Bear Lake, all of Minn.

[73] Assignee: Minnesota Mining and Manufacturing Company, St. Paul, Minn.

[ * ] Notice: The portion of the term of this patent subsequent to Sept. 4, 1990, has been disclaimed.

[22] Filed: Jan. 2, 1973

[21] Appl. No.: 320,254

Related U.S. Application Data

[60] Division of Ser. No. 42,437, June 1, 1970, Pat. No. 3,757,250, which is a continuation-in-part of Ser. No. 32,330, April 27, 1970, abandoned, which is a continuation-in-part of Ser. No. 599,576, Dec. 6, 1966, abandoned.

[52] U.S. Cl. .................. 331/94.5 H, 331/94.5 K
[51] Int. Cl. ............................................. H01s 3/00
[58] Field of Search ................. 331/94.5 H, 94.5 K

[56] References Cited
UNITED STATES PATENTS
3,757,250   9/1973   Packard et al. ................. 331/94.5

Primary Examiner—Edward S. Bauer
Attorney, Agent, or Firm—Alexander, Sell, Steldt & DeLaHunt

[57] ABSTRACT

An optical scanning device utilizing an electron beam laser. The laser includes a source of electrons and a light resonant cavity which includes a II–VI compound direct band-gap semiconductor crystal having a pair of major broad optically smooth opposing parallel reflectively coated surfaces. When a beam of electrons of sufficient energy is impinged upon one of the major broad reflectively coated surfaces, laser emission produced within an active region of the crystal is emitted from the least reflective of the reflectively coated crystal surfaces in a direction substantially normal thereto. The active region depth is less than the crystal thickness in the direction normal to the opposing reflectively coated surfaces.

2 Claims, 7 Drawing Figures

PATENTED FEB 4 1975

3,864,645

3,864,645

ELECTRON BEAM LASER OPTICAL SCANNING DEVICE

CROSS REFERENCE TO RELATED APPLICATIONS

This application, is a divisional application of our co-pending U.S. patent application Ser. No. 42,437, filed June 1, 1970 as a continuation-in-part application of our then co-pending U.S. patent application Ser. No. 32,330, filed Apr. 27, 1970, Ser. No. 32,330 having been filed as a continuation-in-part application of then co-pending Ser. No. 599,576 filed Dec. 6, 1966. Both applications Ser. No. 599,576 and Ser. No. 32,330 are now abandoned. Application Ser. No. 42,437 issued as U.S. Pat. No. 3,757,250 on Sept. 4, 1973.

BACKGROUND OF THE INVENTION

The present invention is directed to an optical scanning device utilizing an electron beam laser for transmitting graphic or pictorial information in the form of modulated electromagnetic radiation.

It is known to utilize an electron beam to bombard either a crystal platelet or a wafer cut from a bulk crystal of a II–VI semiconductor to produce laser action. Conventionally, the crystal or wafer is bombarded by the electron beam on a surface which is perpendicular to the cavity edges or reflective surfaces of a cavity whereby the electromagnetic radiation is produced out the cavity edges in a direction parallel to the plane of the face bombarded by the exciting beam. The dimension of the cavity of a crystal is obtained by cleaving the crystal to form parallel spaced cleaved faces. The separation or distance between the cleaved faces determines the cavity dimension.

For purposes of finding the relationship between the direction of excitation and the resulting electromagnetic radiation, the following terms will be used:

The electromagnetic radiation emerging from the crystal through one of the reflective faces in a direction substantially normal to the bombard face of the cavity shall be referred to as in the "NEF" direction for "normal to excited face" while the geometry of the prior art wherein the electromagnetic radiation is emitted from the crystal through one of the reflective faces in a direction parallel to the face bombarded by the exciting energy source shall be referred to as in the "PEF" direction for "parallel to excited face".

The possibility of achieving laser action in the NEF direction with an electron beam has been predicted theoretically but not heretofore achieved.

SUMMARY OF THE INVENTION

According to the present invention we provide an optical scanning device comprising a two-dimensionally scannable electron beam laser which produces electromagnetic radiation in the NEF direction by stimulated emission from a II-VI compound direct band-gap semiconductor crystal contained within a light resonant cavity. It is pointed out that when laser emission is produced from the crystal, the active region within the crystal (i.e. the region penetrated by the electron beam) is less than the crystal thickness in the direction normal to the opposing reflective faces.

Briefly, the laser comprises a light resonant cavity having a pair of spaced, opposing, reflective surfaces forming the cavity, with one reflective surface being more reflective than the other. The cavity includes a II–VI compound direct band-gap semiconductor crystal having a pair of major broad optically smooth opposed parallel surfaces. Each of the cavity reflective surfaces is oriented parallel to the major broad crystal surfaces. When a beam of electrons of sufficient energy is impinged upon one of the broad major crystal surfaces, laser emission produced within the crystal is emitted through the least reflective of the reflective surfaces in a direction substantially normal to the major broad parallel crystal surfaces.

The optical scanning device of the present invention further comprises means for scanning the electron beam across one major broad parallel crystal surface and means for modulating the electron beam, whereby the produced electromagnetic radiation can be utilized for transmitting graphic or pictorial information in the form of modulated electromagnetic radiation.

Based upon the teachings of the present invention, an electron beam laser using a $CdS_xSe_{(1-x)}$ crystal platelet for producing electromagnetic radiation in a NEF direction has been achieved. The electron beam laser can use a $CdS_xSe^{(1-x)}$ crystal platelet directly out of a growing furnace. Thus, the platelet need not be further fabricated into a cavity by cleaving or polishing.

In one experiment, the $CdS_xSe_{(1-x)}$ crystal had its large, natural grown vapor coated with silver to form highly reflective surfaces, the reflectivity of the crystal face to be bombarded by the electron beam being slightly higher. The platelet was cooled to a temperature of about 77°K, near the temperature of liquid nitrogen, and bombarded on the more highly silvered surface with an electron beam having a current density which is sufficient to cause a population inversion between levels of lower and higher energy to produce electromagnetic radiation by stimulated emission which exhibits line narrowing and superlinearity.

The resulting electromagnetic radiation clearly exhibited directionality and the emission showed spatial and temporal coherence. The peak electromagnetic radiation appeared to occur between 6320 A to 6340 A with the maximum peak occurring at about 6331 A.

The $CdS_xSe_{(1-x)}$ single crystals utilized in various experiments were selected to have a power conversion efficiency which was at least sufficient to permit stimulated emission when the crystal was bombarded by an electron beam of a predetermined voltage and current density.

The primary advantage of the present invention is that a crystal of a semiconductor compound can be excited locally by an electron beam directed at one of its crystal surfaces to produce coherent electromagnetic radiation from an opposite surface, thus making a device which emits from a crystal surface a two-dimensionally scanned and modulated information-carring coherent beam of radiation, which in fact is the consequence of a deflected and modulated electron beam striking the crystal.

Another advantage of the present invention is that a single crystal of a II-VI compound direct band-gap semiconductor can be excited by an electron beam of a predetermined intensity directed at one of the cavity surfaces to produce electromagnetic radiation in a NEF direction.

Yet another advantage of the present invention is that a $CdS_xSe_{(1-x)}$ single crystal platelet can be excited by a source of energy of a predetermined intensity which bombards the platelet on one of its large naturally grown faces to produce electromagnetic radiation in the visible spectrum.

Yet another advantage of the present invention is that the electromagnetic radiation produced by stimulated emission in the NEF direction exhibits emission line narrowing.

A further advantage of the present invention is that a II-VI compound crystal platelet can be coated with a reflective surface whereby the large crystal surfaces are utilized as the cavity reflective surfaces to produce a Fabry-Perot cavity wherein electromagnetic radiation is emitted normal to the face excited by the electron beam.

BRIEF DESCRIPTION OF THE DRAWING

These and other advantages of the present invention can be determined by reference to the accompanying description and drawing wherein.

DESCRIPTION OF THE PREFERRED EMBODIMENT

Briefly, the present invention relates to an optical scanning device having means for producing electromagnetic radiation in the form of visible light by stimulated emission in the NEF direction. A naturally grown single crystal platelet of a semiconductor having a serve of spaced planar faces can serves as a resonant cavity. Means are provided for exciting the platelet by directing at one of the reflective faces an electron beam having at least sufficient incident intensity to penetrate the reflective surface and to excite the platelet into stimulated emission. The electromagnetic radiation is emitted from the platelet through the other reflective face in an direction which is substantially normal to the plane of the bombarded face.

In one embodiment of the present invention, a semiconductor platelet comprising a II-VI compound was utilized. The II-VI compound was a naturally grown $CdS_xSe_{(1-x)}$ single crystal platelet having about 0.2 percent zinc and a low surface strain in terms of surface dislocations, the absence of a destruction layer and the like.

Such $CdS_xSe_{(1-x)}$ single crystal platelets can be grown utilizing known vapor growing techniques in a furnace in an atmosphere of inert gas at elevated temperatures. The $CdS_xSe_{(1-x)}$ platelet grows naturally from a surface or face of a $CdS_xSe_{(1-x)}$ crystal. In one experiment, a $CdS_xSe_{(1-x)}$ crystal was ultilized wherein $x$ was approximately 0.3.

Selection of a naturally grown crystal avoids the disadvantage of requiring fabrication by cleaving crystal platelets or preparing crystals cut from bulk crystals by mechanical or chemical polishing techniques. However, it is anticipated that a fabricated crystal can be prepared to utilize the teachings of this invention.

Figure 1:
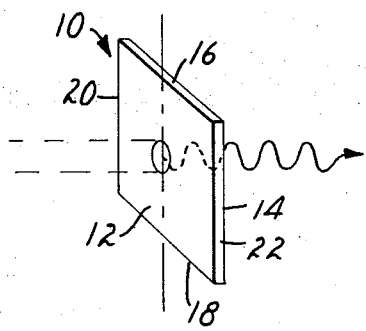
FIG. 1 is an illustration of a single $CdS_xSe_{(1-x)}$ crystal having vapor coated silver reflective surfaces thereon.

An example of a naturally grown single crystal platelet is a $CdS_xSe_{(1-x)}$ platelet which is generally rectangular in shape, although it can have other shapes. In FIG. 1, a naturally grown $CdS_xSe_{(1-x)}$ single crystal platelet 10 has two natural, relatively large, substantially planar, smooth reflective faces 12 and 14. In this particular embodiment, the platelet is relatively thin and it is preferred to have faces 12 and 14 parallel. These faces are shown in FIG. 1 as planar; they need not be. The faces 12 and 14 as shown are substantially parallel to each other and contain the "c"-axis of the crystal platelet 10. The reflective faces 12 and 14 form two reflective surfaces of a resonant cavity. Additionally, the platelet 10 has two natural ends 16 and 18 and at least two edges 20 and 22. The ends 16 and 18 and the edges 20 and 22 should be irregular crystal surfaces. Since neither the ends 16 and 18 nor the edges 20 and 22 are critical to the cavity dimension, the reflective faces 12 and 14 may be any desired length or width.

In one experiment, the platelet had a thickness in the order of about 50 microns, a length along its "c"-axis of about 5 millimeters, and a width in the order of about 1 millimeter. Further, it is contemplated that the single crystal platelet can be in the form of a crystalline film grown or deposited on a substrate. Such crystalline films can have relatively larger lateral dimensions and smaller thicknesses than those of a freely grown single crystal platelet because of the mechanical strength afforded by the substrate to the crystal or crystallites formed thereon. Additionally, it is contemplated that a crystal wafer can be fabricated into a different geometry wherein the "c"-axis is not oriented in the plane of the platelet.

The naturally grown crystal platelets need not be further fabricated to form a resonant cavity. The smooth planar faces 12 and 14 which are perpendicular to and extend between the ends 16 and 18 and edges 20 and 22 form the reflective surfaces of the cavity. The cavity dimension is then determined by the thickness of the crystal. The reflective faces 12 and 14 which form the reflective surfaces of the cavity were vapor coated with silver. Face 12 is vapor coated to less than one per cent transmitting or about 95 percent reflecting while face 14 is vapor coated to about 8 percent transmitting or about 90 percent reflecting.

Electrons from an exciting electron beam having a sufficiently high current density to cause a population inversion are directed at reflective face 12 of the platelet. The electrons must also have sufficient energy to penetrate into the platelet causing a population inversion which excites the platelet into stimulated emission.

In one experiment, the $CdS_xSe_{(1-x)}$ crystal cavity dimension was about 50 microns and the electron beam penetrated into the cavity, at one of the reflective faces, in the order of five to ten microns. It is hypothesized that stimulated emission occurs by the following mechanism; but applicants are not to be bound by this theory of operation. Population inversion occurs in the region penetrated by the electron beam. The attenuation of NEF radiation in the region of 40 to 45 microns of the crystal cavity not penetrated by the electron beam must be less than that necessary to destroy the resonance in the cavity. When the cavity dimension exceeds the penetration depth of the electrons, low attenuation of radiation within the unpenetrated region can be explained by a phonon assisted transition, or by saturation of the absorption transition, or by a transition wherein the terminal state is also an excited state of the crystal. Obviously, this attenuation may alternatively be reduced by making the cavity dimension thinner. In this experiment, laser emission in the PEF direction was not observed, since the attenuation of radiation in that direction was higher because of longer path length, higher diffraction losses, cavity misalignment in that direction, and low reflectivity at unsilvered roughened and nonparallel edges and sides.

The $CdS_xSe_{(1-x)}$ platelets utilized in the examples herein were selected to have a power conversion efficiency which was at least sufficient to permit stimulated emission when the platelet was bombarded by an electron beam of a predetermined voltage and current density. The term "power conversion efficiency" when used herein is meant to be the ratio between substantially all the electromagnetic power output emitted from the unsilvered cavity surface bombarded by the electron beam and the power provided by the source of energy incident upon the platelet. A power conversion efficiency exceeding about $10^{-2}$ percent as measured in the spontaneous emission region for an unsilvered cavity was necessary for the crystal to produce stimulated emission.

Figure 2:
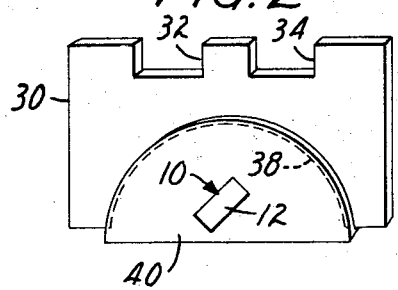
FIG. 2 is a diagrammatic representation of a $CdS_xSe_{(1-x)}$ crystal mounted on a tab mounting device in preparation for bombardment by an electron beam.

Referring now to FIG. 2, the $CdS_xSe_{(1-x)}$ crystal in one experiment was mounted in a tab mounting device generally designated as 30. The tab mounting device 30 is made of copper having outside dimensions of a length of about 2.5 centimeters, a width of about 1 centimeter and a thickness of about 1 millimeter. The tab mounting device 30 had two slots 32 and 34 cut therein to permit removable mounting of the device into a cryostat tail section of the apparatus of FIG. 3. A semicircular sector 38 having a diameter of about 1 centimeter is cut into the tab mounting device 30 on the edge opposite the slots 32 and 34. A semicircular carrier 40 having a diameter which is slightly greater than that of the sector 38 is mounted over the sector 38 by means of an adhesive formed from vacuum grease and copper powder. In one experiment, a conductive coated sapphire carrier was used. However, the carrier 40 may be some other electrically conductive or conductively coated material which provides mechanical support for the crystal, which is transparent to the wavelength of the emitted electromagnetic radiation, and which is capable of thermally conducting heat from the crystal. Crystal 10 is mounted approximately in the center of the carrier 40 by means of adhesive such as vacuum grease or a suitable adhesive. The crystal 10 is mounted on the carrier 40 such that the reflective face having the least amount of silver coating is in contact via the adhesive with the carrier 40. In FIG. 2, the crystal 10 is illustrated with reflective face 12 being spaced from the carrier 40 whereas reflective face 14 is the surface adhered to carrier 40. The electron beam is positioned to bombard reflective face 12 and the resulting electromagnetic radiation is transmitted out of reflective face 14 through carrier 40.

Figure 3:
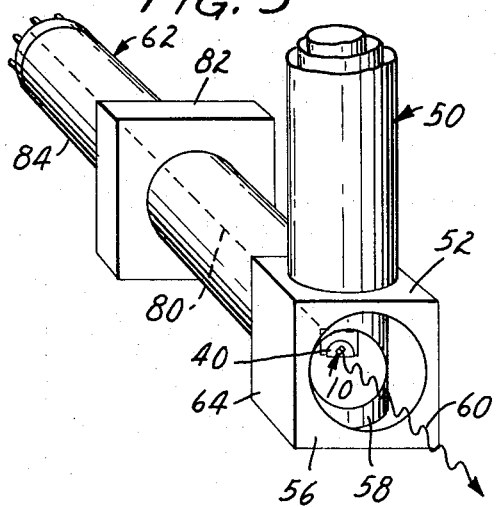
FIG. 3 is a diagrammatic representation of apparatus for producing coherent electromagnetic radiation in the NEF direction by stimulated emission of a $CdS_xSe_{(1-x)}$ crystal with an electron beam.

FIG. 3 illustrates apparatus which may be used for producing laser emission from a semiconductor platelet. Briefly, the laser apparatus comprises a cryostat tail section 50 containing a liquid refrigerant such as liquid nitrogen which is ultimately used as the means for cooling the $CdS_xSe_{(1-x)}$ platelet to a predetermined ambient temperature. The cryostat tail section 50 may be, for example, an optical access tail section for a standard helium cryostat.

A rectangular block housing member 52, which is about 5 centimeters on each side and constructed of nonmagnetic stainless steel, has a hollowed-out interior. The member 52 has an opening in one side which receives the cryostat tail section 50. Inside the interior of member 52, the tail section 50 terminates in a cold finger to which is attached the tab mounting device 30 which supports the platelet 10 as described. The member 52 has, on an adjacent side 56, a quartz window 58 which is about 2.5 centimeters in diameter. The quartz window 58 allows the radiation from platelet 10 to exit from the member 52.

When the platelet 10 is excited into stimulated emission, the electromagnetic radiation, illustrated as arrow 60, is emitted from the reflective face of platelet 10, and out of member 52 via the quartz window 58. The radiation 60 is detected by means of a photodetector (not shown) such as an RCA type 922.

Means for generating an energy beam such as an electron gun 62 is secured to the block housing member 52 on a side 64, which side is directly opposite to and in alignment with the side 56 containing the quartz window 58. The electron gun 62 may be, for example, an RCA electron gun type VC2126. The electron gun 62 includes a thoriated tungsten directly-heated cathode. Appropriate grids are used for modulating, focusing and accelerating the electron beam 80 onto the reflective face 12 of platelet 10. A means for deflecting and scanning the electron beam, such as a deflection coil 82, is positioned about an electron gun housing 84 in axial alignment with the electron beam 80. In one embodiment, the electron beam had a potential of about 50 KV and a current density ranging up to 10amps/cm² and greater with a beam cross-section of about 300 microns in diameter.

In this embodiment, the "c"-axis of the $CdS_xSe_{(1-x)}$ platelet is in the plane of the platelet and perpendicular to the electron beam 80 and radiation is produced in the NEF direction as shown. The electric field vector associated with the electromagnetic radiation appears to be in a direction perpendicular to the "c"-axis of the platelet.

Figure 4:
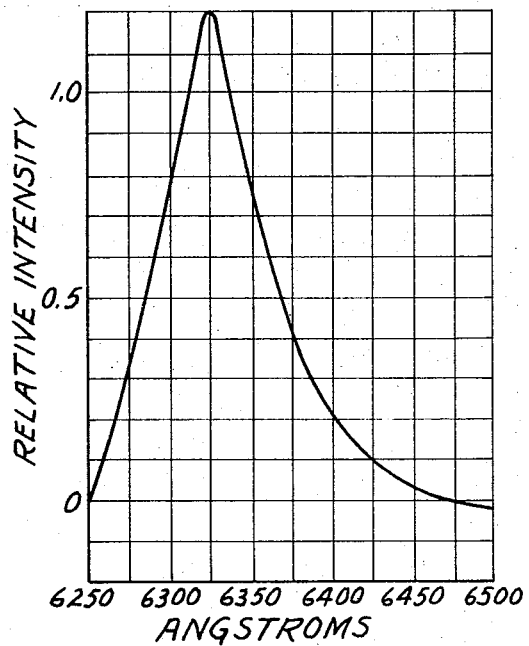
FIGS. 4 and 5 are graphic representations of the emission spectrum of electromagnetic radiation from a $CdS_xSe_{(1-x)}$ single crystal in the NEF direction at a temperature of about 77°K, below and above threshold respectively.
Figure 5:
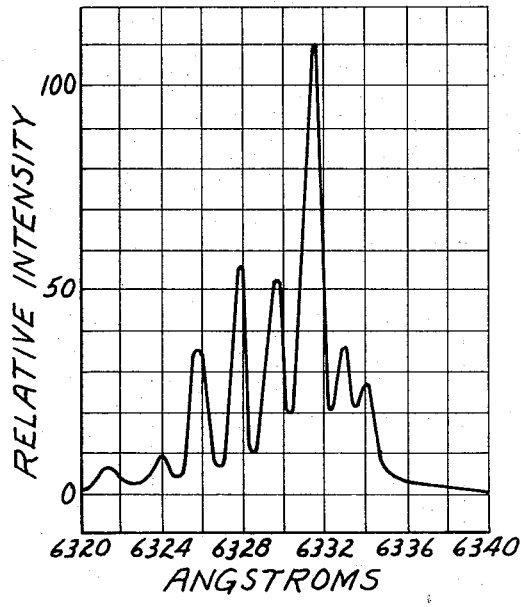

Referring now to FIGS. 4 and 5, the graphs illustrate in a waveform the output emission intensity from a $CdS_xSe_{(1-x)}$ platelet, wherein x approximately equal 0.3, versus wavelength below and above threshold for stimulated emission. The reflective faces 12 and 14 of platelet 10 form a Fabry-Perot cavity having a cavity dimension of about 50 microns, which also is the platelet thickness. The resulting emission from the crystal during stimulated emission is in the red portion of the spectrum at about 6320 A to about 6340 A when the crystal is cooled to about 77°K.

The $CdS_xSe_{(1-x)}$ platelet was cooled to a temperature of about 77°K, near the temperature of liquid nitrogen, and bombarded with a pulsed electron beam. The electron beam had a voltage of about 50 KV and a current density of about 10amps/cm². The pumping pulses had a duration of about one-tenth of a microsecond. The output intensity from the platelet 10 was found to be at a maxiumum at about 6331 A.

When the electron beam current was below threshold, or less than about 4 amps/cm², and upon sweeping the output intensity with a spectrometer grating, an emission line having a maximum output intensity was found to occur at about 6320 A over a bandwidth between 6250 A and 6480 A or about 250 A. The half width of the emission line near 6320 A was about 65 A. FIG. 4 illustrates the emission spectrum of the $CdS_xSe_{(1-x)}$ platelet at a temperature of about 77°K when the crystal is pumped by an electron beam having a current which is below the 4amps/cm² needed to cause stimulated emission.

When the electron beam current was increased to exceed 5 amps/cm², say up to about 10 amps/cm², and upon sweeping the output intensity in the same manner as described, the output intensity was found to peak at about 6331 A. Both above and below threshold modulation of electron beam resulted in corresponding modulation of the emitted radiation. The emission line of the radiation peaked at a higher maximum output intensity, for example relative intensity of about 100 above threshold versus a relative intensity of about 1 below threshold. The emission line exhibited line narrowing wherein the half width of the highest intensity emission line was found to be less than 0.5 A and possibly narrower. When the electron beam was directed onto other parts of the crystal, coherent radiation was emitted from these parts, illustrating scanability.

FIG. 5 illustrates the emission spectrum emitted from the same $CdS_xSe_{(1-x)}$ platelet excited by an electron beam having a current which is sufficient to cause stimulated emission. The characteristic structure in the spectrum corresponds to the mode oscillations appropriate to the resonant cavity.

The peak or average wavelength appears to occur experimentally around 6331 A with a measured spacing between modes or a $\Delta\lambda$ of about 2 A.

The theoretical spacing between modes can be calculated by the following equation:

$$\Delta\lambda = \lambda^2/2d(n-\lambda(dn/d\lambda))$$

wherein:
$\lambda$ = average wavelength,
$d$ = cavity dimension,
$n$ = index of refraction for semiconductor,
$dn/d\lambda$ = change in index of refraction per unit change in wavelength for the semiconductor at $\lambda$.

The $\lambda$, in the above sample, was 6331 A and $d$ equalled 50$\mu$. Using reasonable values of $n$ equals 2.8, and $dn/d\lambda$ equals $-2 \times 10^{-3}$ $A^{-1}$, this equation when solved using the above values yields a $\Delta\lambda$ of 2.5 A, which is in good agreement with the experimental $\Delta\lambda$ of 2 A.

The electromagnetic radiation emanating from this laser apparatus under conditions of stimulated emission is both temporally coherent, which describes the monochromatic nature of the emitted light, and spatially coherent, which describes the tendency of the emergent light to undergo little divergence.

Figure 6:
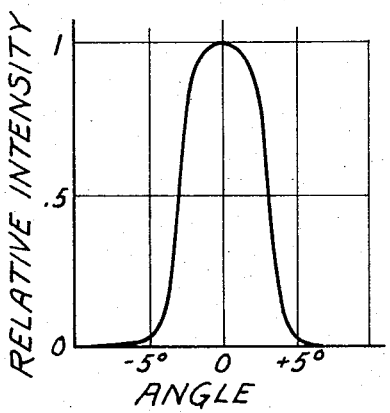
FIG. 6 is a diagrammatic representation of the relative intensity of the electromagnetic radiation as a function of an angle showing directionality of the electromagnetic radiation in the plane defined by the "c"-axis and the normal to the platelet.

FIG. 6 is a graphic representation of the light intensity as a function of angle in the plane defined by the "c"-axis and the normal to the platelet. This representation was made by taking a picture of the visible light emanating from the platelet 10 about 3 centimeters from the quartz window 58 and plotting the exposure on the photograph along a transverse across the image. The resulting curve, as expected, clearly demonstrates directionality associated with coherent light.

Figure 7:
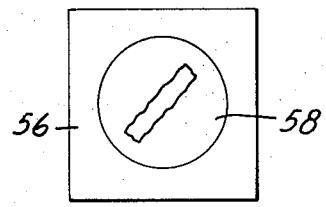
FIG. 7 is a diagrammatic representation of the electromagnetic radiation emanating from the single $CdS_xSe_{(1-x)}$ crystal passing through the window of the apparatus in FIG. 3.

FIG. 7 is a diagrammatic representations of the photograph of the visible light emanating from the platelet through the window 58 and from which the graph of FIG. 6 was obtained.

Having thus described a preferred embodiment of an optical scanning device utilizing an electron beam laser, it is understood that modifications thereof are apparent to one having ordinary skill in the art and all such modifications and equivalents thereof are contemplated as being within the scope of the appended claims.

What is claimed is:

1. An optical scanning device for transmitting graphic information in the form of modulated electromagnetic radiation, comprising
   means for producing electromagnetic radiation by stimulated emission from a light resonant cavity including a semiconductor crystal, comprising
   a light resonant cavity including a II–VI compound direct band-gap semiconductor crystal having a pair of major broad optically smooth opposing parallel surfaces;
   means for providing almost totally reflective surfaces parallel to each major broad crystal surface for defining said cavity, with one reflective surface being more reflective than the other; and
   means for exciting said crystal into stimulated emission by directing at one of said major broad surfaces an electron beam having sufficient energy to create in said crystal, an active region excited into a state of stimulated emission corresponding to the penetration region of the electron beam, to cause coherent electromagnetic radiation to be emitted from said cavity through the least reflective of the reflective surfaces in a direction which is substantially normal to the major broad crystal surfaces;
   wherein when said coherent electromagnetic radiation is emitted, the active region depth is less than the crystal thickness in the direction normal to the parallel surfaces;
   means for scanning the electron beam across said one broad crystal surface; and
   means for modulating the electron beam.

2. An optical scanning device for transmitting graphic information in the form of electromagnetic radiation, comprising
   means for producing electromagnetic radiation by stimulated emission from a light resonant cavity consisting of semiconductor crystal, comprising
   a light resonant cavity consisting of a II–VI compound direct band-gap semiconductor crystal having a pair of major broad optically smooth opposing parallel surfaces;
   means for providing almost totally reflective surfaces parallel to each major broad crystal surface for defining said cavity, with one reflective surface being more reflective than the other; and
   means for exciting said cavity into stimulated emission by directing at one of said major broad surfaces an electron beam having sufficient energy to create in the cavity, an active region excited into a state of stimulated emission corresponding to the penetration region of the electron beam, to cause coherent electromagnetic radiation to be emitted from said cavity through the least reflective of the reflective surfaces in a direction which is substantially normal to the major broad crystal surfaces; wherein when said coherent electromagnetic radiation is emitted, the active region depth is less than the cavity thickness in the direction normal to the parallel surfaces;

means for scanning the electron beam across said one broad crystal surface; and means for modulating the electron beam.

* * * * *

UNITED STATES PATENT OFFICE
CERTIFICATE OF CORRECTION

PATENT NO. : 3,864,645
DATED : February 4, 1975
INVENTOR(S) : James R. Packard, Donald A. Campbell, William C. Tait and Gunther H. Dierssen It is certified that error appears in the above-identified patent and that said Letters Patent are hereby corrected as shown below:

Column 2, line 2, change "opposed" to -- opposing --.

Column 3, line 49, change "serve" to -- pair --; and line 50, change "serves" to -- serve --.

Signed and Sealed this twenty-second Day of July 1975

[SEAL]

Attest:

RUTH C. MASON
Attesting Officer

C. MARSHALL DANN
Commissioner of Patents and Trademarks